US010134422B2

(12) United States Patent
Hwang et al.

(10) Patent No.: US 10,134,422 B2
(45) Date of Patent: Nov. 20, 2018

(54) DETERMINING AUDIO EVENT BASED ON LOCATION INFORMATION

(71) Applicant: QUALCOMM Incorporated, San Diego, CA (US)

(72) Inventors: Kyu Woong Hwang, Daejeon (KR); Yongwoo Cho, Seoul (KR); Jun-Cheol Cho, Seoul (KR); Sunkuk Moon, Seongnam (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/956,212

(22) Filed: Dec. 1, 2015

(65) Prior Publication Data
US 2017/0154638 A1    Jun. 1, 2017

(51) Int. Cl.
G10L 21/00      (2013.01)
G10L 25/51      (2013.01)
G06K 9/00       (2006.01)
G08B 3/10       (2006.01)
G10L 25/72      (2013.01)
(Continued)

(52) U.S. Cl.
CPC ............. *G10L 25/51* (2013.01); *G01S 3/803* (2013.01); *G01S 3/808* (2013.01); *G01S 5/18* (2013.01); *G01S 5/20* (2013.01); *G01S 5/22* (2013.01); *G01S 5/28* (2013.01); *G06K 9/00711* (2013.01); *G06K 9/00771* (2013.01); *G08B 3/10* (2013.01); *G08B 13/1672* (2013.01); *G10L 17/26* (2013.01); *G10L 21/028* (2013.01);
(Continued)

(58) Field of Classification Search
CPC ..... G10L 25/51; G10L 25/72; G06K 9/00711; G06K 9/000771; G06K 2009/00738; G08B 3/10
USPC ................. 704/273, 274, 275, 278
See application file for complete search history.

(56) References Cited

U.S. PATENT DOCUMENTS 7,495,998 B1    2/2009    Deligeorges et al.
7,733,371 B1    6/2010    Monroe
(Continued)

FOREIGN PATENT DOCUMENTS

WO    03093775 A2    11/2003
WO    2006110630 A2    10/2006
WO    2011008099 A1    1/2011

OTHER PUBLICATIONS

Atrey P.K., et al., "Audio Based event Detection for Multimedia Surveillance", Acoustics, Speech and Signal Processing, ICASSP 2006 Proceedings, IEEE International Conference on, 2006, vol. 5, 4 Pages.

(Continued)

*Primary Examiner* — Thierry L Pham
(74) *Attorney, Agent, or Firm* — Toler Law Group, P.C.

(57) ABSTRACT

A method of determining, by an electronic device, an audio event is disclosed. The method may include receiving an input sound from a sound source by a plurality of sound sensors. The method may also extracting, by a processor, at least one sound feature from the received input sound, determining, by the processor, location information of the sound source based on the input sound received by the sound sensors, determining, by the processor, the audio event indicative of the input sound based on the at least one sound
(Continued)

feature and the location information, and transmitting, by a communication unit, a notification of the audio event to an external electronic device.

30 Claims, 15 Drawing Sheets

(51) Int. Cl.
　　*G01S 5/20*　　(2006.01)
　　*G01S 5/22*　　(2006.01)
　　*G08B 13/16*　　(2006.01)
　　*G10L 17/26*　　(2013.01)
　　*G10L 21/028*　　(2013.01)
　　*G01S 3/803*　　(2006.01)
　　*G01S 3/808*　　(2006.01)
　　*G01S 5/18*　　(2006.01)
　　*G01S 5/28*　　(2006.01)
　　*G10L 25/00*　　(2013.01)
　　*G08B 13/196*　　(2006.01)

(52) U.S. Cl.
　　CPC .... *G10L 25/72* (2013.01); *G06K 2009/00738* (2013.01); *G08B 13/19695* (2013.01)

(56) References Cited

U.S. PATENT DOCUMENTS

| 2006/0256660 | A1 | 11/2006 | Berger | |
|---|---|---|---|---|
| 2007/0237358 | A1 | 10/2007 | Tseng et al. | |
| 2015/0066671 | A1* | 3/2015 | Nichols | G06Q 20/20 705/18 |
| 2016/0379456 | A1* | 12/2016 | Nongpiur | G08B 13/1672 340/541 |
| 2017/0105080 | A1* | 4/2017 | Das | H04R 29/00 |

OTHER PUBLICATIONS

Valenzise G., et al., "Scream and Gunshot Detection and Localization for Audio-Surveillance Systems," IEEE Conference on Advanced Video and Signal Based Surveillance (AVSS), 2007, pp. 1-6.
International Search Report and Written Opinion—PCT/US2016/058918—ISA/EPO—dated Mar. 16, 2017.
Partial International Search Report and Written Opinion—PCT/US2016/058918—ISA/EPO—dated Jan. 23, 2017.

* cited by examiner

|           | GLASS BREAKING | GUNSHOT | SCREAMING | SPEECH | ... |
|-----------|----------------|---------|-----------|--------|-----|
| SOUND 132 | 13             | 23      | 88        | 34     | ... |
| SOUND 142 | 18             | 21      | 76        | 43     | ... |
| SOUND 152 | 79             | 45      | 13        | 21     | ... |
| SOUND 162 | 91             | 8       | 38        | 7      | ... |

*FIG. 4A*

|  | GLASS BREAKING | GUNSHOT | SCREAMING | SPEECH | ... |
|---|---|---|---|---|---|
| SOUND 132 | 21 | 35 | 95 | 34 | ... |
| SOUND 142 | 10 | 13 | 67 | 32 | ... |
| SOUND 152 | 69 | 40 | 8 | 21 | ... |
| SOUND 162 | 93 | 11 | 43 | 7 | ... |

*FIG. 4B*

| AUDIO EVENT | LOCATION | TIME |
|---|---|---|
| GUNSHOT | TV | 09:35 OCT. 6, 2015 |
| GLASS BREAK | WINDOW | 09:45 OCT. 6, 2015 |
| SCREAMING | TV | 10:58 OCT. 6, 2015 |
| DOOR KNOCK | FRONT DOOR | 14:07 OCT. 6, 2015 |
| HUMAN SPEECH | FRONT DOOR | 14:08 OCT. 6, 2015 |
| HUMAN SPEECH | TV | 15:22 OCT. 6, 2015 |
| GLASS BREAK | TABLE | 19:58 OCT. 6, 2015 |
| ⋮ | ⋮ | ⋮ |

*FIG. 10*

DETERMINING AUDIO EVENT BASED ON LOCATION INFORMATION

FIELD OF THE DISCLOSURE

The present disclosure relates generally to audio processing, and more specifically, to identifying an audio event for an input sound.

DESCRIPTION OF RELATED ART

Recently, the use of surveillance systems such as audio surveillance systems, video surveillance systems, and the like has become widespread in households to enhance security. Such surveillance systems often provide data communication functionalities over wireless or wired networks. In addition, such surveillance systems may provide a variety of functions designed to enhance user convenience such as sound processing, image or video processing, etc.

Some conventional surveillance systems are equipped with a sound event detection function. For example, an audio surveillance system may be equipped with a sound event detection function capable of detecting sound such as a screaming sound, a glass breaking sound, or a gunshot sound as a sound event upon capturing the sound by a microphone. In such a case, the surveillance system may provide a notification to a user when such sound event is detected.

However, conventional surveillance systems typically detect sound events based on captured sounds. As a result, such surveillance systems may not be able to sufficiently distinguish sound events generated from sounds originating from different sound sources. For example, sounds from a speaker in a TV or a radio and sounds from other sources may not be sufficiently distinguished from each other. In such a case, a surveillance system may detect sound from a speaker in a TV as a sound event and provide a notification of the sound event to a user. For example, various sounds from a TV such as a screaming sound, a gunshot sound, and the like may be detected as a sound event for which a notification is provided to the user even when the sound event is not a significant event relating to security of the premises or safety of a person. Thus, such surveillance systems may not be able to accurately detect sound events that require a notification to a user.

SUMMARY OF THE INVENTION

The present disclosure provides methods and apparatus for determining an audio event for an input sound.

According to one aspect of the present disclosure, a method of determining, by an electronic device, an audio event is disclosed. The method may include receiving, by a plurality of sound sensors, an input sound from a sound source. The method may also include extracting, by a processor, at least one sound feature from the received input sound, determining, by the processor, location information of the sound source based on the input sound received by the sound sensors, determining, by the processor, the audio event indicative of the input sound based on the at least one sound feature and the location information, and transmitting, by a communication unit, a notification of the audio event to an external electronic device. This disclosure also describes a device relating to this method.

According to another aspect of the present disclosure, an electronic device may include a plurality of sound sensors, a feature extractor, a location determination unit, and an audio event determination unit. The plurality of sound sensors may be configured to receive an input sound from a sound source. Further, the feature extractor may be configured to extract at least one sound feature from the input sound. In addition, the location determination unit may be configured to determine location information of the sound source based on the input sound received by the plurality of sound sensors, and the audio event determination unit may be configured to determine an audio event indicative of the input sound based on the at least one sound feature and the location information.

BRIEF DESCRIPTION OF THE DRAWINGS

Embodiments of this disclosure will be understood with reference to the following detailed description, when read in conjunction with the accompanying drawings.

FIG. 4A is a table illustrating detection probabilities of sounds for a plurality of audio events generated based on a classification model, according to one embodiment of the present disclosure.

FIG. 4B is a table illustrating detection probabilities of sounds for a plurality of audio events generated based on a modified classification model, according to one embodiment of the present disclosure.

FIG. 10 illustrates an exemplary audio event log generated by an electronic device over a period of time, according to one embodiment of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
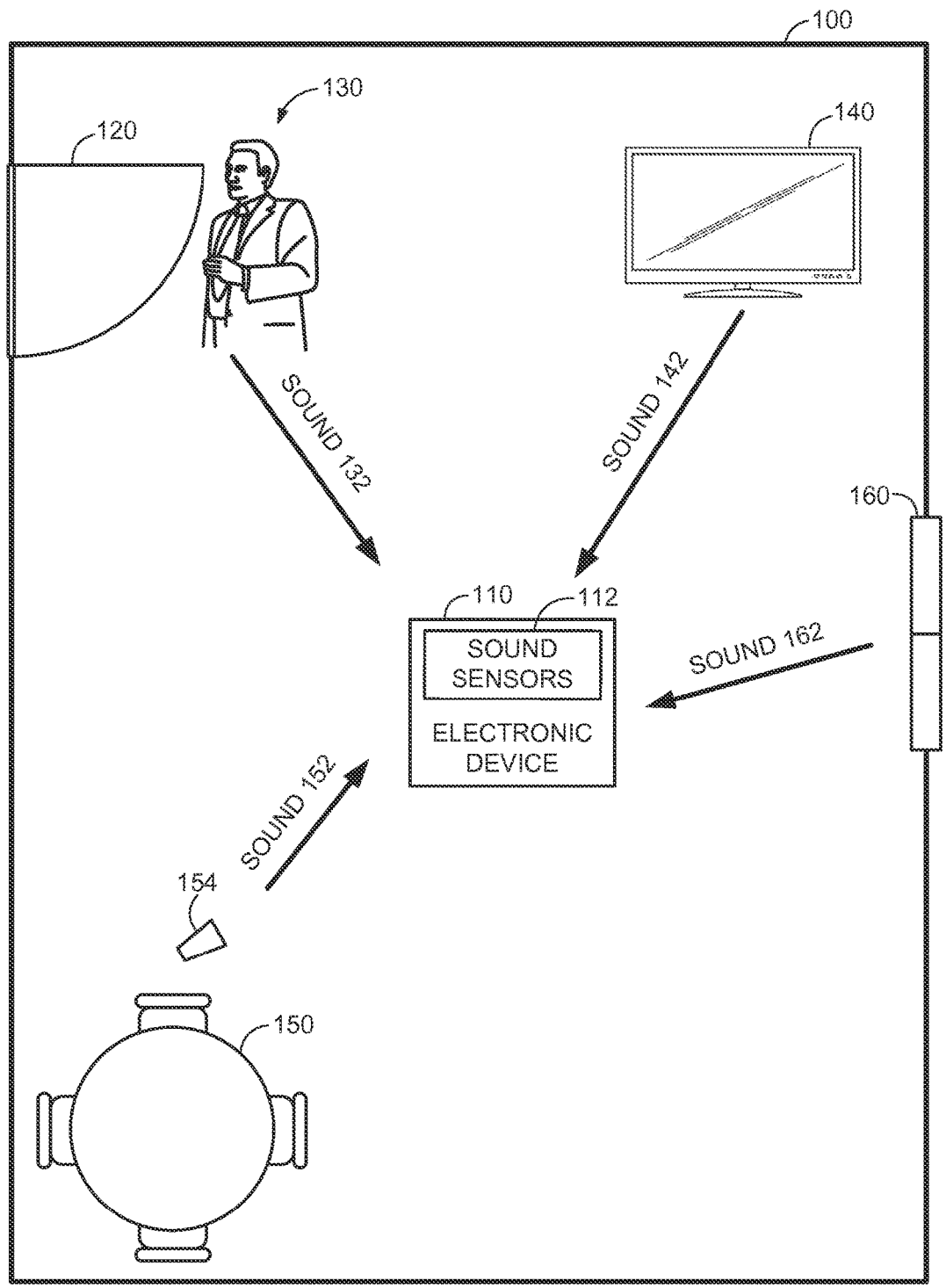
FIG. 1 illustrates an electronic device configured to receive an input sound in a room and determine an audio event for the input sound, according to one embodiment of the present disclosure.

FIG. 1 illustrates an electronic device 110 configured to receive an input sound in a room 100 and determine an audio event for the input sound, according to one embodiment of the present disclosure. As used herein, the term "audio event" may describe or indicate a type or a class of sound and may refer to an occurrence of any type or class of sounds including a speech sound, a screaming/crying sound, a door knocking sound, a glass breaking sound, a gunshot sound, a footstep sound, a falling sound, a television sound, etc. The electronic device 110 may be any suitable device equipped with sound capturing and processing capabilities such as an audio/video surveillance system, a webcam, a smartphone, a laptop computer, a tablet computer, a gaming device, a multimedia player, a smart TV, etc. The electronic device 110 may be equipped with a plurality of sound sensors 112 (e.g., two or more microphones) adapted to capture an input sound. Although the sound sensors 112 of the electronic device 110 are shown to be in the room 100 to capture input sounds, the electronic device 110 may be located in any portions of a house, an office, an apartment, or the like, and one or more sound sensors 112 may be disposed in any suitable locations therein. Further, the sound sensors 112 may be configured to communicate with the electronic device 110 via a wired or a wireless communication connection.

The electronic device 110 may be configured to receive various types of sounds in the room 100 via the sound sensors 112. In the illustrated embodiment, the electronic device 110 may receive one or more types of sounds from various sound sources such as a screaming sound 132 from a person 130 near a front door 120, a screaming sound 142 from a television 140, a glass breaking sound 152 from a falling cup 154 near a table 150, and a glass breaking sound 162 from a window 160. In response to receiving an input sound from each of the sound sources 130, 140, 154, and 160 via the sound sensors 112, the electronic device 110 may determine location information of the sound sources 130, 140, 154, and 160. As used herein, the term "location information" may refer to any data or information indicating or describing a location, position, or direction of an object or a room and may be defined or described relative to one or more sound sensors. For example, the electronic device 110 may determine a direction of the sound source 130, 140, 154, or 160 relative to the sound sensors 112, or a location of the sound source 130, 140, 154, or 160 relative to the sound sensors 112 based on the associated input sound received by the sound sensors 112.

In one embodiment, the location information of one or more objects in the room 100 relative to the sound sensors 112 may be pre-stored in the electronic device 110. For example, the location information of a plurality of objects (e.g., the front door 120, the television 140, the table 150, and the window 160) relative to the sound sensors 112 may be stored in the electronic device 110 as location data or a map, which may be generated from one or more images of the room 100 or in response to a user input. Additionally or alternatively, if the sound sensors 112 are located in a plurality of rooms, the location information and type (e.g., bathroom, kitchen, dining room, living room, etc.) of each of the rooms may be pre-stored in the electronic device 110 as identification information of the rooms.

In an additional or alternative embodiment, historical data of audio events including prior occurrences of audio events at various locations in the room 100 may be stored in the electronic device 110. For example, the historical data of audio events may indicate that the audio events "screaming sound," "glass breaking sound," and "gunshot sound" are often generated from a location or direction of the television 140 while these audio events are rarely generated near the front door 120. If the sound sensors 112 are disposed in a plurality of rooms, the historical data of audio events may also include prior occurrences of audio events at various locations in each of the rooms.

Once the location information of the sound source 130, 140, 154, or 160 is determined, the electronic device 110 may determine an audio event indicative of the sound 132, 142, 152, or 162 based on the sound characteristics and the location information of the sound 132, 142, 152, or 162. In one embodiment, the electronic device 110 may also use the location information of the objects 120, 140, 150, and 160 and/or the historical data of audio events in determining the audio event indicative of the sound 132, 142, 152, or 162. Additionally or alternatively, in case the sound sensors 112 are located in a plurality of rooms, the electronic device 110 may also use the identification information of the rooms and/or the historical data of audio events in determining an audio event.

In the illustrated embodiment, the electronic device 110 may determine that the sounds 132 and 162 are audio events based on at least sound characteristics (e.g., sound features) and location information of the sound 132 and 162. For example, the electronic device 110 may receive the sound 132 from the person 130 via the sound sensors 112 and determine that the sound 132 originates from a location or direction near the front door 120. Since the screaming sound 132 originating from the front door 120 may be an event relevant to security of the room 100 and/or the front door 120 does not include any predetermined source of such sound, the electronic device 110 may determine the sound 132 as an audio event "screaming sound." On the other hand, since the screaming sound 142 originating from a location or direction near the television 140 may not be an event relevant to security and/or the television 140 may be a predetermined source of such sound, the electronic device 110 may determine that the sound 142 is not an audio event "screaming sound." In one embodiment, the electronic device 110 may be configured to determine the sound originating from the location or direction near the television 140 as an audio event "television sound."

In a similar manner, the electronic device 110 may determine that the sound 162 from the location or direction of the window 160 is an audio event "glass breaking sound" while determining that the sound 152 of the falling cup 154 from the location or direction near the table 150 is not an audio event "glass breaking sound." Alternatively, the electronic device 110 may determine that the sound 162 from the location or direction of the window 160 is an audio event "window breaking sound" while the sound 152 of the falling cup 154 from the location or direction near the table 150 is an audio event "dish breaking sound." Once an audio event is determined for an input sound, the electronic device 110 may store the audio event along with the input sound, the location information of the sound source, and/or a timestamp indicative of a time the input sound has been received by the sound sensors 112.

According to some embodiments, if a predetermined audio event is detected from a predetermined location in the room 100, the electronic device 110 may generate a notification of the predetermined audio event. Alternatively or additionally, the electronic device 110 may generate a notification for an audio event other than the predetermined audio event. In the illustrated embodiment, notifications of the screaming sound 132 near the front door 120 and the glass breaking sound 162 from the window 160 may be transmitted to an external electronic device of a user. By determining an audio event indicative of an input sound based on sound characteristics and location information of the input sound, the electronic device 110 may provide a notification for one or more predetermined audio events that may relate to security or be of interest to the user of the electronic device 110.

Figure 2:
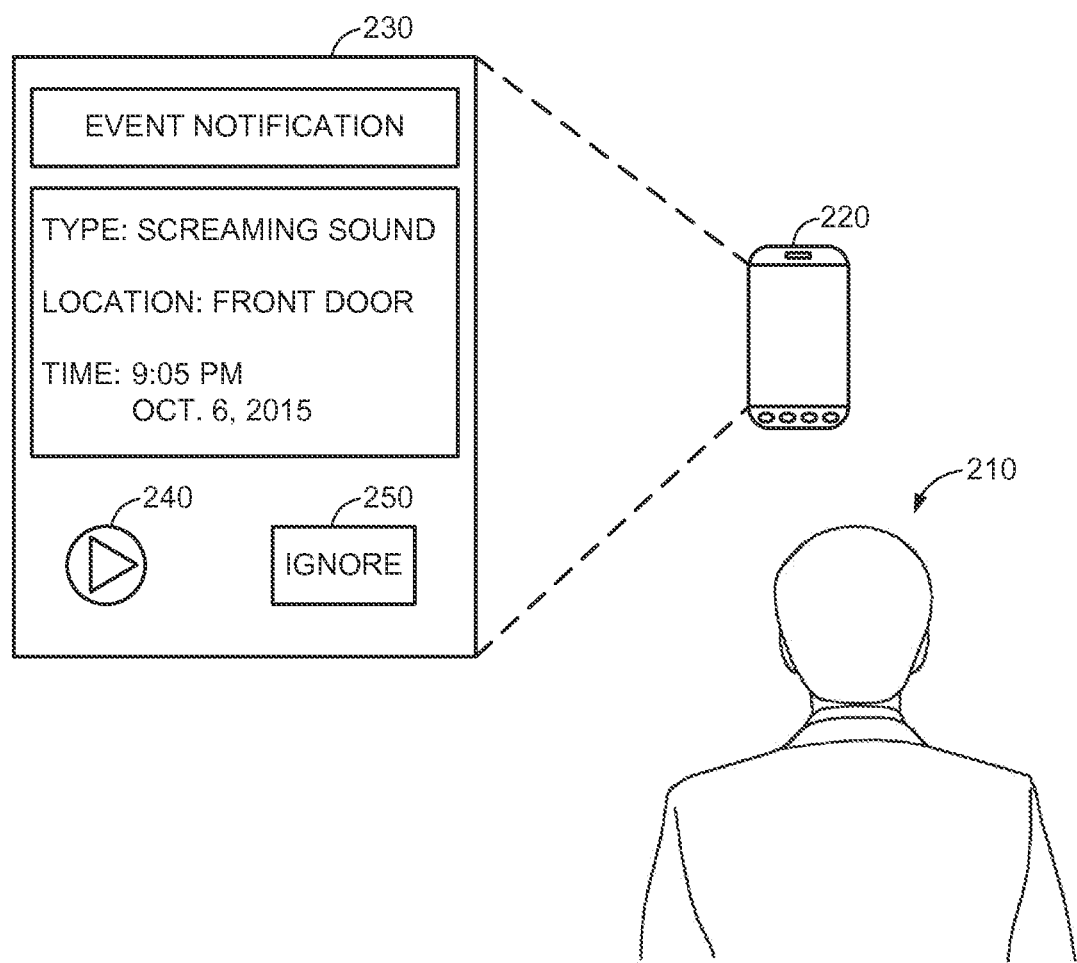
FIG. 2 illustrates an external electronic device configured to output an audio event notification for a user, according to one embodiment of the present disclosure.

FIG. 2 illustrates an external electronic device 220 configured to output an audio event notification 230 for a user 210, according to one embodiment of the present disclosure. The external electronic device 220 may receive a notification indicating an audio event from the electronic device 110. Upon receiving the notification, the electronic device may output the audio event notification 230, which may include the detected audio event (e.g., a screaming sound, a glass breaking sound, or the like), the location information of the sound source, and a time when the input sound was received by the sound sensors 112.

In the illustrated embodiment, the audio event notification 230 may inform the user 210 that an audio event "screaming sound" has been detected at the front door at 9:05 PM on Oct. 6, 2015. The user 210 may play or reproduce the input sound transmitted from the electronic device 110 associated with the audio event by pressing an icon 240. If the user does not wish to receive a notification for the audio event occurring at the indicated location (i.e., screaming sound at the front door), the user may press an icon 250. In response, the electronic device 110 may not generate a notification for the audio event "screaming sound" occurring at the front door.

Figure 3:
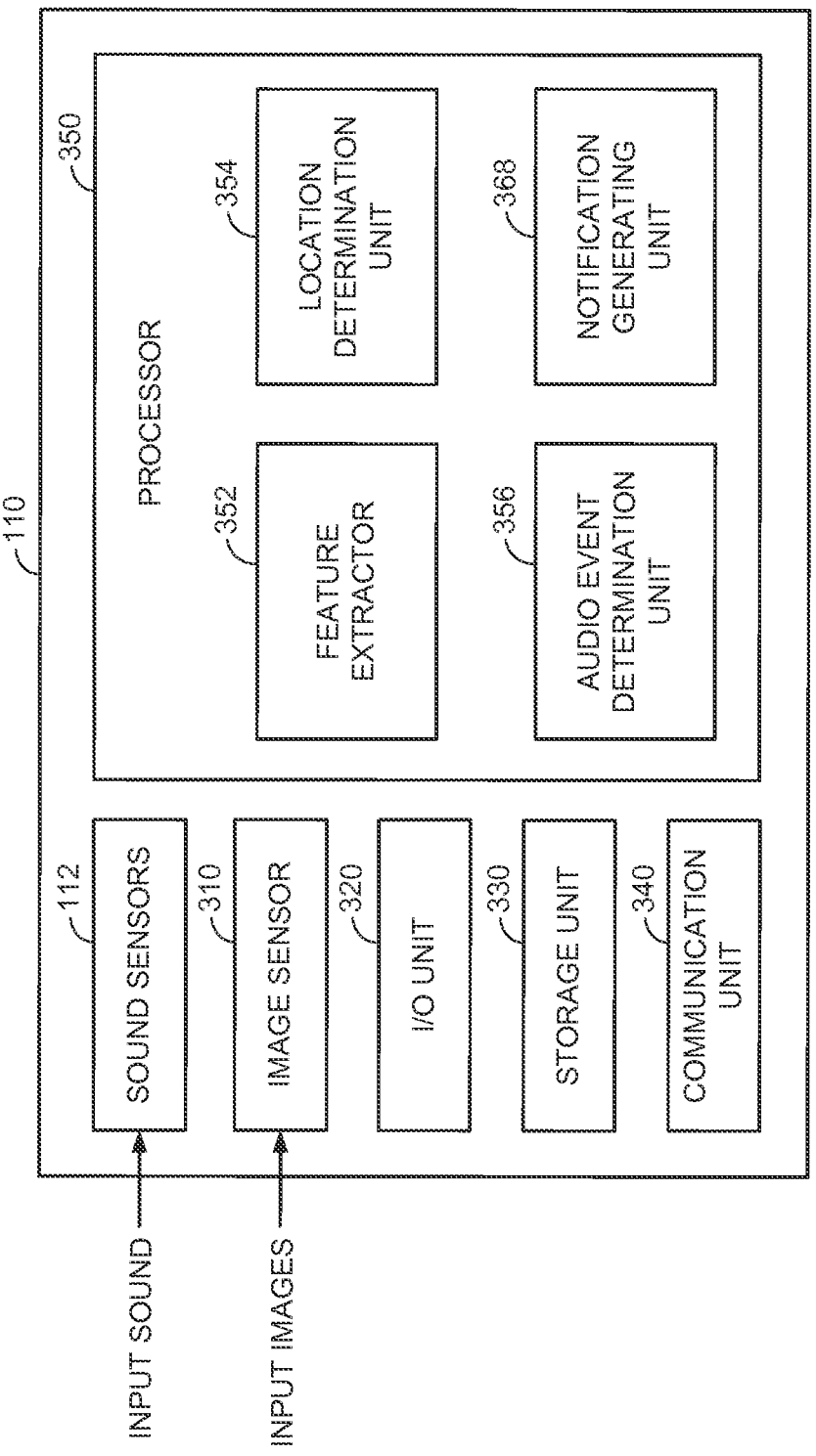
FIG. 3 illustrates a block diagram of an electronic device configured to receive an input sound from a sound source in a room and determine an audio event for the input sound, according to one embodiment of the present disclosure.

FIG. 3 illustrates a block diagram of the electronic device 110 configured to receive an input sound from a sound source in the room 100 and determine an audio event for the input sound, according to one embodiment of the present disclosure. The electronic device 110 may include the plurality of sound sensors 112, an image sensor 310, an I/O unit 320, a storage unit 330, a communication unit 340, and a processor 350. The storage unit 330 may be remote or local storage, and may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

The processor 350 may be any suitable processor, processing unit, or circuitry capable of managing and/or operating the electronic device 110, such as an application processor (AP), central processing unit (CPU), digital signal processor (DSP), etc. As shown, the processor 350 may include a feature extractor 352, a location determination unit 354, an audio event determination unit 356, and a notification generating unit 358. As used herein, the term "unit" may refer to one or more hardware components, sections, parts, or circuitry capable of performing or adapted to perform one or more functions and may additionally perform such functions in conjunction with or by executing processes, instructions, procedures, subroutines, or the like (e.g., program code, microcode, etc.). In turn, a "unit" may be segmented into smaller units (e.g., sub-units) or two or more units may be combined into a single "unit."

Each of the sound sensors 112 may be configured to continuously, periodically, or intermittently receive an input sound from a sound source located in or outside the room 100 and generate sound data corresponding to the input sound. The sound sensors 112 may include two or more sound sensors (e.g., microphones) that may be used to receive, capture, sense, and/or detect an input sound and may be disposed at any suitable locations in the room 100 or the electronic device 110. In addition, the sound sensors 112 may employ any suitable software and/or hardware for performing such functions. Although the electronic device 110 is shown as including the sound sensors 112, the sound sensors 112 may be located outside the electronic device 110. In this case, the sound sensors 112 may be configured to communicate with the electronic device 110 via the communication unit 340 to transmit sounds received therefrom.

Upon generating the sound data, each of the sound sensors 112 may provide the sound data to the processor 350, which may determine whether the intensity of the sound data received from each of the sound sensors 112 is greater than a threshold sound intensity. In a particular embodiment, the threshold sound intensity may be a predetermined threshold sound intensity. Upon determining that the intensity of the sound data received from at least one of the sound sensors 112 is greater than the threshold sound intensity, the processor 350 may provide the sound data from the sound sensors 112 to the location determination unit 354.

Additionally, the processor 350 may provide the sound data from each of the sound sensors 112 that is determined to have an intensity greater than the threshold sound intensity to the feature extractor 352. Alternatively, the processor 350 may be configured to provide the sound data received from each of the sound sensors 112 to the feature extractor 352 and the location determination unit 354 without determining the intensity of the sound data. In some embodiments, as the sound data are received from the sound sensors 112, the processor 350 may also determine an arrival time of the input sound at each of the sound sensors and provide the arrival times to the location determination unit 354 and the notification generating unit 358.

Upon receiving the sound data from each of the sound sensors 112 that is determined to have an intensity greater than the threshold sound intensity, the feature extractor 352 may extract at least one sound feature from the sound data using any suitable feature extraction scheme such as an MFCC (Mel-frequency cepstral coefficients) method, etc. In one embodiment, the feature extractor 352 may be configured to extract at least one sound feature from the sound data having a highest sound intensity. The at least one sound feature extracted from the sound data may then be provided to the audio event determination unit 356.

In addition, the location determination unit 354 may determine location information of the sound source based on the sound data received by each of the sound sensors 112. In one embodiment, the location determination unit 354 may determine a direction of the sound source relative to the sound sensors 112. For example, the direction of the sound source relative to the sound sensors 112 may be determined by calculating phase differences of the sound data received by each of the sound sensors 112 or calculating differences in the arrival times at the sound sensors 112.

Alternatively or additionally, the location determination unit 354 may determine a location of the sound source relative to the sound sensors 112. For example, the location of the sound source relative to the sound sensors 112 may be determined by detecting the intensity of the sound data associated with each of the sound sensors 112, and calculating differences in the sound intensities of the sound data from the sound sensors 112. In an additional or alternative embodiment, the location determination unit 354 may select a sound sensor associated with the sound data having a highest intensity, and determine the location of the sound source based on a location of the selected sound sensor. For example, the location determination unit 354 may determine that the sound source is near the location of the selected sound sensor. Once the location determination unit 354 determines the location information of the sound source including at least one of a direction or location of the sound source relative to the sound sensors 112, it may provide the location information to the audio event determination unit 356.

Upon receiving the at least one sound feature from the feature extractor 352 and the location information of the sound source from the location determination unit 354, the audio event determination unit 356 may determine an audio event indicative of the input sound based on the at least one sound feature and the location information. In one embodiment, the audio event determination unit 356 may receive at least one of historical data of audio events, location data, and a classification model, which may be stored in and accessed from the storage unit 330. The historical data of audio events may include prior occurrences of audio events associated with various locations in the room 100.

The location data may include location information of objects in the room 100 and may be generated from one or more images of the room 100 captured by the image sensor 310 or in response to a user input via the I/O unit 320. The classification model may be used in identifying a plurality of audio events based on sound features by using a detection probability model for each of the audio events. Each detection probability model may be used in calculating a probability of one or more sound features being indicative of an audio event associated with the detection probability model. For example, the classification model may include detection probability models for audio events such as "screaming sound," "glass breaking sound," "gunshot sound," etc. that may be used in calculating probabilities of one or more sound features being indicative of such audio events. In some embodiments, the classification model may include any suitable detection models for identifying audio events such as detection likelihood models, detection score models, etc.

According to some embodiments, the electronic device 110 may generate a detection probability model for an audio event. For example, if utensil sound is frequently detected from the table 150, the electronic device 110 may generate a detection probability model for "utensil sound" based on the detected sounds. In this case, a user may input an audio event label for the generated detection probability model such as "utensil sound."

In one embodiment, the audio event determination unit 356 may determine an audio event indicative of the input sound based on the at least one sound feature and the location information using the historical data of audio events and the classification model. In this case, the audio event determination unit 356 may identify an audio event associated with the at least one sound feature by using the classification model. For example, the audio event determination unit 356 may calculate a detection probability of the at least one sound feature for each of the audio events by using the detection probability models in the classification model. The audio event having the highest detection probability may then be selected as the audio event associated with the at least one sound feature.

Upon identifying the audio event, the audio event determination unit 356 may determine whether the historical data of audio events indicates that the audio event has occurred frequently (e.g., greater than or equal to a predetermined number of occurrences or frequency of occurrence) in a location or direction indicated by the location information. If it is determined that the audio event has not occurred frequently in the location or direction, the audio event determination unit 356 may determine that the audio event is indicative of the input sound. For example, if it is determined that the audio event "screaming sound" has not occurred frequently near the front door 120, the audio event determination unit 356 may determine that the audio event "screaming sound" is indicative of the sound 132. On the other hand, if the audio event is determined to have occurred frequently in the location or direction indicated by the location information, the audio event may be determined not to be indicative of the input sound. For example, if it is determined that the audio event "screaming sound" has occurred frequently near the television 140, the audio event determination unit 356 may determine that the audio event "screaming sound" is not indicative of the sound 142.

In another embodiment, the audio event determination unit 356 may determine an audio event indicative of the input sound based on the at least one sound feature and the location information of the sound source of the input sound using the location data and the classification model. In this case, by using the location data of the objects in the room 100, the audio event determination unit 356 may identify an object (e.g., the front door 120, the television 140, the table 150, the window 160, a wall, etc.) near the sound source of the input sound. The audio event determination unit 356 may then determine whether to modify the classification model based on the identified object. For example, the audio event determination unit 356 may modify the classification model if the identified object is a predetermined object (e.g., the front door 120, the television 140, the window 160, etc.).

Upon determining to modify the classification model, the audio event determination unit 356 may adjust the detection probability model associated with one or more of the audio events based on the identified object. For example, if the identified object is the front door 120 or the window 160, the audio event determination unit 356 may adjust detection probability models for audio events that may be associated with security or breach of security (e.g., "screaming sound," "glass breaking sound," "gunshot sound," etc.) to increase detection probabilities. On the other hand, if the identified object is the television 140 or the table 150, the audio event determination unit 366 may modify detection probability models for audio events that may be associated with security or breach of security to decrease detection probabilities. Additionally or alternatively, if the identified object is the television 140, the audio event determination unit 356 may determine that the audio event "television sound" is indicative of the input sound without calculating the detection probabilities for the audio events.

The audio event determination unit 356 may then determine an audio event indicative of the input sound based on the classification model, which may or may not have been modified. In one embodiment, the audio event determination unit 356 may calculate a detection probability of the input sound for each of the audio events by using the detection probability models, and selecting an audio event having the highest detection probability as the audio event indicative of the input sound. In some embodiments, the audio event determination unit 356 may determine that the input sound is not associated with any audio event if the highest detection probability is less than a threshold detection probability. In a particular embodiment, the threshold detection probability may be a predetermined threshold detection probability.

Upon determining the audio event indicative of the input sound, the audio event determination unit 356 may store the identified audio event in the storage unit 330 and provide the identified audio event to the notification generating unit 358. In one embodiment, the identified audio event may be stored in an audio event log within the storage unit 330. The audio event log may also include the sound data, the identified object, and an arrival time of the input sound associated with the identified audio event. In one embodiment, the audio event log may be used as the historical data of audio events.

In response to receiving the identified audio event, the notification generating unit 358 may determine whether the identified audio event is a predetermined audio event associated with an object located near the sound source of the input sound. For example, if the object is the front door 120 or the window 160, the notification generating unit 358 may determine whether the received audio event is one of a plurality of predetermined audio events such as "screaming sound," "glass breaking sound," "gunshot sound," etc. In this case, the notification generating unit 358 may generate and transmit a notification to the external electronic device 220 via the communication unit 340. In addition, the processor 350 may activate the image sensor 310 to capture one or more images. Further, the processor 350 may adjust the image sensor 310 to move or rotate in a direction towards the sound source. The captured one or more images may also be stored the audio event log in association with the identified audio event. On the other hand, if the object is the television 140, the notification generating unit 358 may determine that the identified audio event is not one of the predetermined audio events such that a notification is not generated. In another embodiment, the notification generating unit 358 may generate and transmit a notification to the external electronic device 220 without determining whether the identified audio event is a predetermined audio event associated with an object located near the sound source of the input sound.

FIG. 4A is a table 400 illustrating detection probabilities of sounds 132, 142, 152, and 162 for a plurality of audio events generated based on a classification model, according to one embodiment of the present disclosure. The table 410 may include detection probabilities of the sounds 132, 142, 152, and 162 for a plurality of audio events (e.g., "glass breaking sound," "gunshot sound," "screaming sound," "speech sound," etc.) calculated by using a classification model without being modified. For example, the electronic device 110 may calculate detection probabilities for an input sound using a plurality of detection probability models associated with the plurality of audio events.

As shown, since the sounds 132 and 142 are screaming sounds from the person 130 near the front door 120 and the television 140, respectively, the detection probabilities for the audio event "screaming sound" are higher than the detection probabilities for other audio events. In case a threshold detection probability is 70%, the electronic device 110 may determine that the audio event "screaming sound" is indicative of the sounds 132 and 142. Similarly, since the sounds 152 and 162 are glass breaking sounds from a falling cup 154 near the table 150 and the window 160, respectively, the detection probabilities for the audio event "glass breaking sound" are higher than the other audio events. In case the threshold detection probability is 70%, the electronic device 110 may determine that the audio event "screaming sound" is indicative of the sounds 152 and 162.

FIG. 4B is a table 450 illustrating detection probabilities of sounds 132, 142, 152, and 162 for a plurality of audio events generated based on a modified classification model, according to one embodiment of the present disclosure. In the illustrated embodiment, the electronic device 110 may calculate the detection probabilities for each of the sounds 132, 142, 152, and 162 after modifying the classification model based on the location information of the sound. For example, the electronic device 110 may adjust the detection probability model associated with one or more of the audio events based on the location information of each sound.

In the illustrated embodiment, since the sounds 132 and 162 originate from the front door 120 and the window 160, the electronic device 110 may adjust detection probability models for audio events that may be associated with security or breach of security (e.g., "screaming sound," "glass breaking sound," "gunshot sound," etc.) to increase detection probabilities. On the other hand, since the sounds 142 and 152 originate from the television 140 and the table 150, the electronic device 110 may modify detection probability models for audio events that may be associated with security or breach of security to decrease detection probabilities. As shown, according to the modified classification model, the electronic device 110 may determine that the screaming sound 142 from the television is not associated with the audio event "screaming sound," since the adjusted detection probability of the sound 142 for the audio event "screaming sound" has been adjusted to 67%, which is less than the threshold detection probability of 70%. Alternatively, the electronic device 110 may identify the screaming sound 142 as a "television sound," since the sound 142 originates from the television 140.

Similarly, according to the modified classification model, the electronic device 110 may determine that the glass breaking sound 152 from the falling cup 154 near the table 150 is not associated with the audio event "glass breaking sound," since the adjusted detection probability of the sound 152 for the audio event "screaming sound" has been adjusted to 69%, which is less than the threshold detection probability of 70%. In another embodiment, the electronic device 110 may identify the glass breaking sound 152 as a "dish breaking sound," since the sound 152 originates from the table 150 and identify the glass breaking sound 162 as a "window breaking sound," since the sound 162 originates from the window 160.

Figure 5:
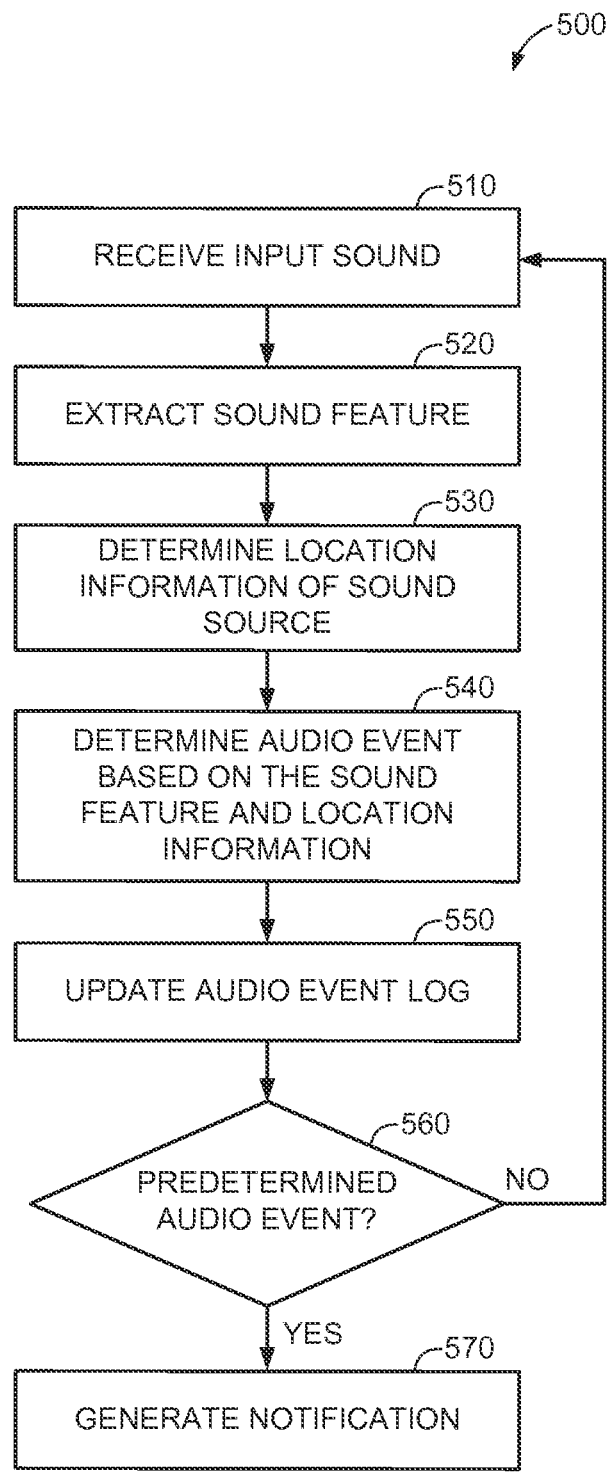
FIG. 5 illustrates a flowchart of an exemplary method performed in an electronic device for determining an audio event for an input sound, according to one embodiment of the present disclosure.

FIG. 5 illustrates a flowchart of an exemplary method 500 performed in the electronic device 110 for determining an audio event for an input sound, according to one embodiment of the present disclosure. Initially, the electronic device 110 may receive an input sound from a sound source via the plurality of sound sensors 112 at 510. For example, each of the sound sensors 112 may generate sound data corresponding to the input sound.

At 520, the electronic device 110 may extract at least one sound feature from the received input sound. For example, the electronic device 110 may extract one or more sound features from the sound data using any suitable feature extraction scheme such as an MFCC (Mel-frequency cepstral coefficients) method, etc. In one embodiment, the electronic device 110 may be configured to extract one or more sound features from the sound data having a highest sound intensity.

The electronic device 110 may then determine location information of the sound source of the input sound at 530 based on the input sound received by the sound sensors 112. In one embodiment, the electronic device 110 may determine a direction of the sound source relative to the sound sensors 112 based on phase differences of the sound data received by each of the sound sensors 112 or arrival times of the input sound at the sound sensors 112. Alternatively or additionally, the electronic device 110 may detect the intensity of the sound data associated with each of the sound sensors 112 and determine a location of the sound source relative to the sound sensors 112 by calculating differences in the sound intensities of the sound data from the sound sensors 112. In an additional or alternative embodiment, the electronic device 110 may select a sound sensor associated with the sound data having a highest intensity, and determine the location of the sound source based on a location of the selected sound sensor.

At 540, the electronic device 110 may determine an audio event indicative of the input sound based on the one or more sound features and location information of the sound source. In some embodiments, an audio event ê indicative of an input sound from a sound source may be determined by selecting an audio event among a plurality of audio events having a maximum probability value according to the following equation:

$$\hat{e} = \underset{e}{\mathrm{Argmax}} \{ P(S \mid e) \times P(e \mid L) \} \quad \text{(Equation 1)}$$

where S represents audio characteristics of the input sound (e.g., one or more sound features extracted from the input sound), L represents a location or direction of the sound source, and e represents an audio event among the plurality of audio events. Once the audio event indicative of the input sound is determined, the electronic device 110 may update an audio event log by storing the determined audio event therein at 550. In one embodiment, the sound data, the location information of the sound source, and a timestamp indicative of a time the input sound is received by the sound sensors 112 associated with the determined audio event may also be stored in the audio event log.

The electronic device 110 may then determine whether the determined audio event is a predetermined audio event associated with a location indicated by the location information of the sound source at 560. For example, if the location indicated by the location information is the front door 120 or the window 160, the electronic device 110 may determine whether the determined audio event is one of a plurality of predetermined audio events such as "screaming sound," "glass breaking sound," "gunshot sound," etc. When the determined audio event is a predetermined audio event associated with the location indicated by the location information of the sound source (i.e., YES at 560), the method 500 may proceed to 570 to generate a notification of the determined audio event. In one embodiment, the generated notification may be transmitted to an external device (e.g., the external electronic device 220 in FIG. 2). If the determined audio event is not a predetermined audio event associated with the location indicated by the location information of the sound source (i.e., NO at 570), the method 500 may proceed back to 510 and receive another input sound via the sound sensors 112.

Figure 6:
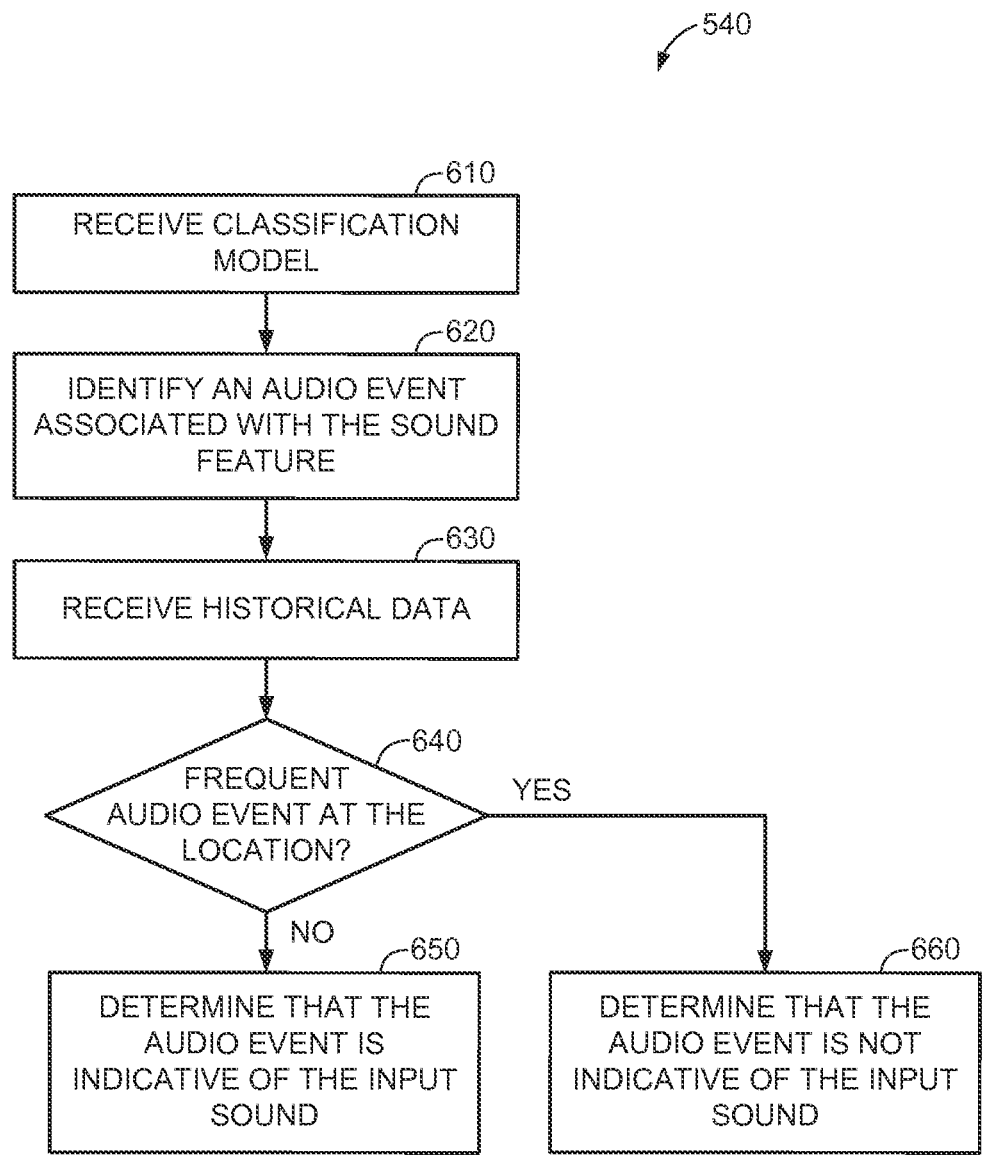
FIG. 6 illustrates a flowchart of an exemplary method performed in an electronic device for determining an audio event indicative of an input sound from a sound source using a classification model and historical data of audio events, according to one embodiment of the present disclosure.

FIG. 6 illustrates a flowchart of an exemplary method 540 performed in the electronic device 110 for determining an audio event indicative of an input sound from a sound source using a classification model and historical data of audio events, according to one embodiment of the present disclosure. Initially, the electronic device 110 may receive a classification model configured to identify a plurality of audio events based on a plurality of sound features at 610. At 620, the electronic device 110 may identify an audio event associated with the one or more sound features by using the classification model. For example, the electronic device 110 may calculate a detection probability of the one or more sound features for each of the audio events by using the detection probability models in the classification model. The audio event having the highest detection probability may then be selected as the audio event associated with the one or more one sound features.

At 630, the electronic device 110 may receive historical data of audio event audio events including prior occurrences of audio events at various locations in the room 100. The electronic device 110 may then determine whether the historical data of audio events indicates that the identified audio event has occurred frequently (e.g., greater than or equal to a predetermined number of occurrences or frequency of occurrence) in a location or direction indicated by the location information of the sound source at 640. If it is determined that the audio event has not occurred frequently in the location or direction indicated by the location information (i.e., NO at 640), the method 540 may proceed to 650 to determine that the identified audio event is indicative of the input sound. On the other hand, if the identified audio event is determined to have occurred frequently in the location or direction indicated by the location information (i.e., YES at 640), the method may proceed to 660 to determine that the identified audio event is not indicative of the input sound. In this case, the method may proceed back to 510 and receive another input sound via the sound sensors 112.

Figure 7:
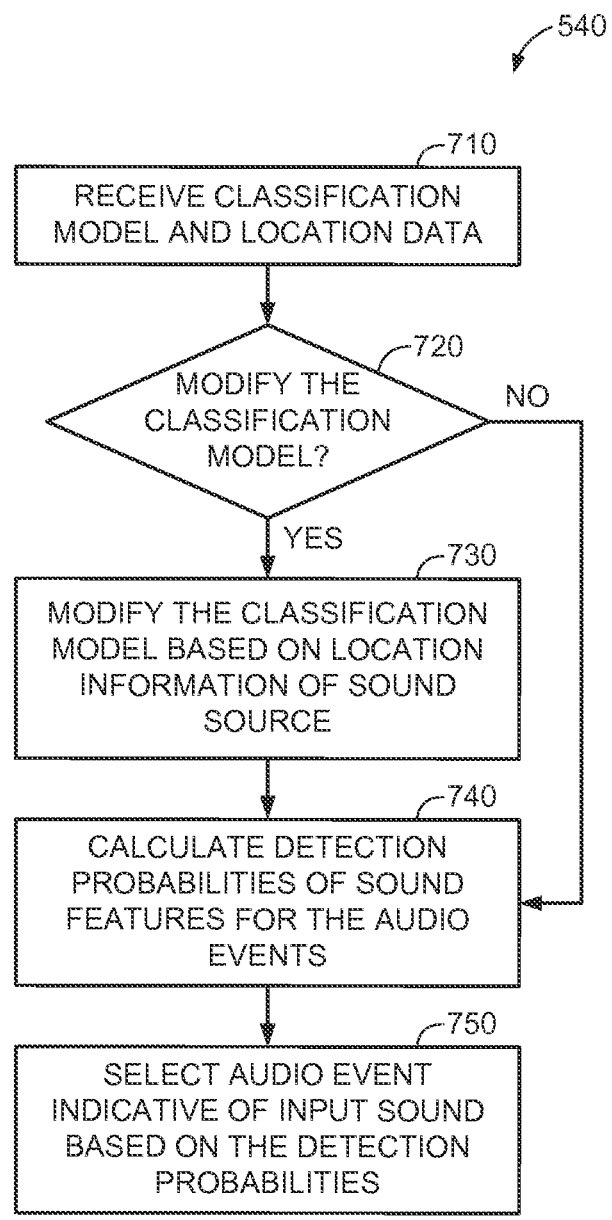
FIG. 7 illustrates a flowchart of an exemplary method performed in an electronic device for determining an audio event indicative of an input sound from a sound source based on one or more sound features extracted from the input sound and location information of the sound source, according to one embodiment of the present disclosure.

FIG. 7 illustrates a flowchart of an exemplary method 540 performed in the electronic device 110 for determining an audio event indicative of an input sound from a sound source based on one or more sound features extracted from the input sound and location information of the sound source using a classification model and location data, according to one embodiment of the present disclosure. Initially, the electronic device 110 may receive a classification model for identifying a plurality of audio events based on a plurality of sound features and location data that includes location information of objects in the room 100 at 710. Based on the location information of the sound source of the input sound and the location data of the objects in the room 100, the electronic device 110 may identify an object (e.g., the front door 120, the television 140, the table 150, the window 160, a wall, etc.) near the sound source of the input sound.

At 720, the electronic device 110 may determine whether to modify the classification model based on the location information of the sound source. For example, the electronic device 110 may modify the classification model if the identified object is a predetermined object (e.g., the front door 120, the television 140, the window 160, etc.). If the electronic device 110 determines to modify the classification model (i.e., YES at 720), the method may proceed to 730 to modify the classification model based on the location information of the sound source at 730. On the other hand, if the electronic device 110 determines not to modify the classification model (i.e., NO at 720), the method 540 may proceed to 740 to calculate detection probabilities of the one or more sound features for the audio events based on the unmodified classification model.

In one embodiment, the electronic device 110 may adjust a detection probability model associated with one or more of the audio events based on the identified object to modify the classification model at 730. For example, if the identified object is the front door 120 or the window 160, the electronic device 110 may adjust detection probability models for audio events that may be associated with security or breach of security (e.g., "screaming sound," "glass breaking sound," "gunshot sound," etc.) to increase detection probabilities. On the other hand, if the identified object is the television 140 or the table 150, the electronic device 110 may modify detection probability models for audio events that may be associated with security or breach of security to decrease detection probabilities.

At 740, the electronic device 110 may calculate detection probabilities of the one or more sound features for the audio events based on the modified or unmodified classification model. The electronic device 110 may then select an audio event having the highest detection probability as the audio event indicative of the input sound. In some embodiments, the electronic device 110 may determine that the input sound is not associated with any audio event if the highest detection probability is less than a threshold detection probability. In a particular embodiment, the threshold detection probability may be a predetermined threshold detection probability.

Figure 8:
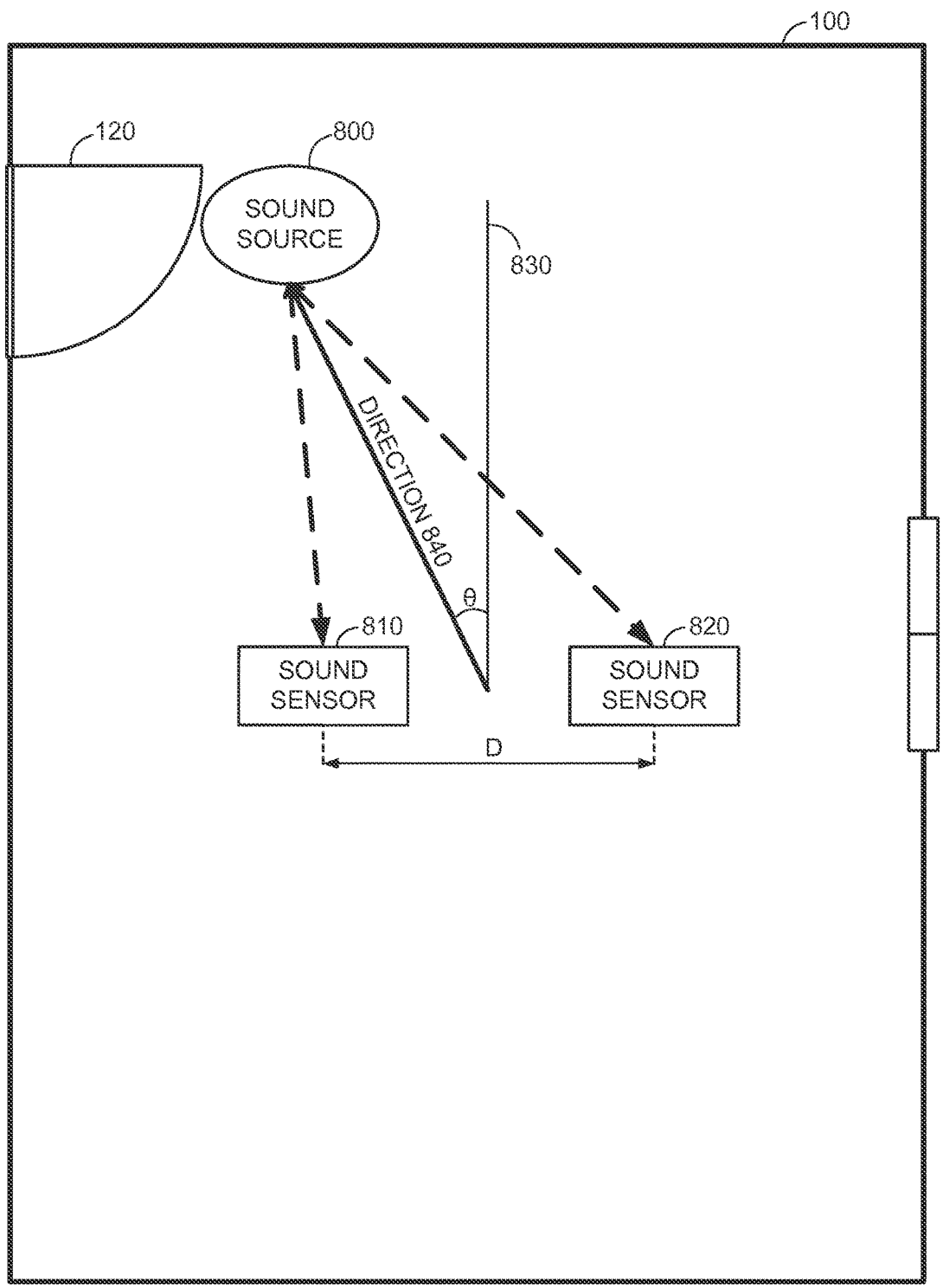
FIG. 8 illustrates an exemplary diagram for determining a direction of an input sound from a sound source relative to sound sensors, according to one embodiment of the present disclosure.

FIG. 8 illustrates an exemplary diagram for determining a direction 830 of an input sound from a sound source 800 relative to sound sensors 810 and 820, according to one embodiment of the present disclosure. In the illustrated embodiment, the sound sensors 810 and 820 may be located at a distance D from each other in the room 100. The sound source 800 may be located near the front door 120.

In one embodiment, the electronic device 110 may determine an arrival time of the input sound at each of the sound sensors 810 and 820 as the input sound from the sound source 800 is being received. In this case, the electronic device 110 may determine location information of the sound source 800 based on the arrival times of the input sound at the sound sensors 810 and 820. For example, the direction 830 of the sound source 800 relative to the sound sensors 810 and 820 may be determined by calculating differences in the arrival times of the input sound at the sound sensors 810 and 820.

In another embodiment, the electronic device 110 may generate sound data corresponding to the input sound for each of the sound sensors 810 and 820 as the input sound from the sound source 800 is being received. In this case, the electronic device may determine location information of the sound source 800 based on the sound data received from each of the sound sensors 810 and 820. For example, the direction 830 of the sound source 800 relative to the sound sensors 810 and 820 may be determined by calculating phase differences of the sound data received by each of the sound sensors 112. Although the sound sensors 810 and 820 are shown, any suitable number of sound sensors and/or any other suitable sensor may be used in determining the direction 830.

Figure 9:
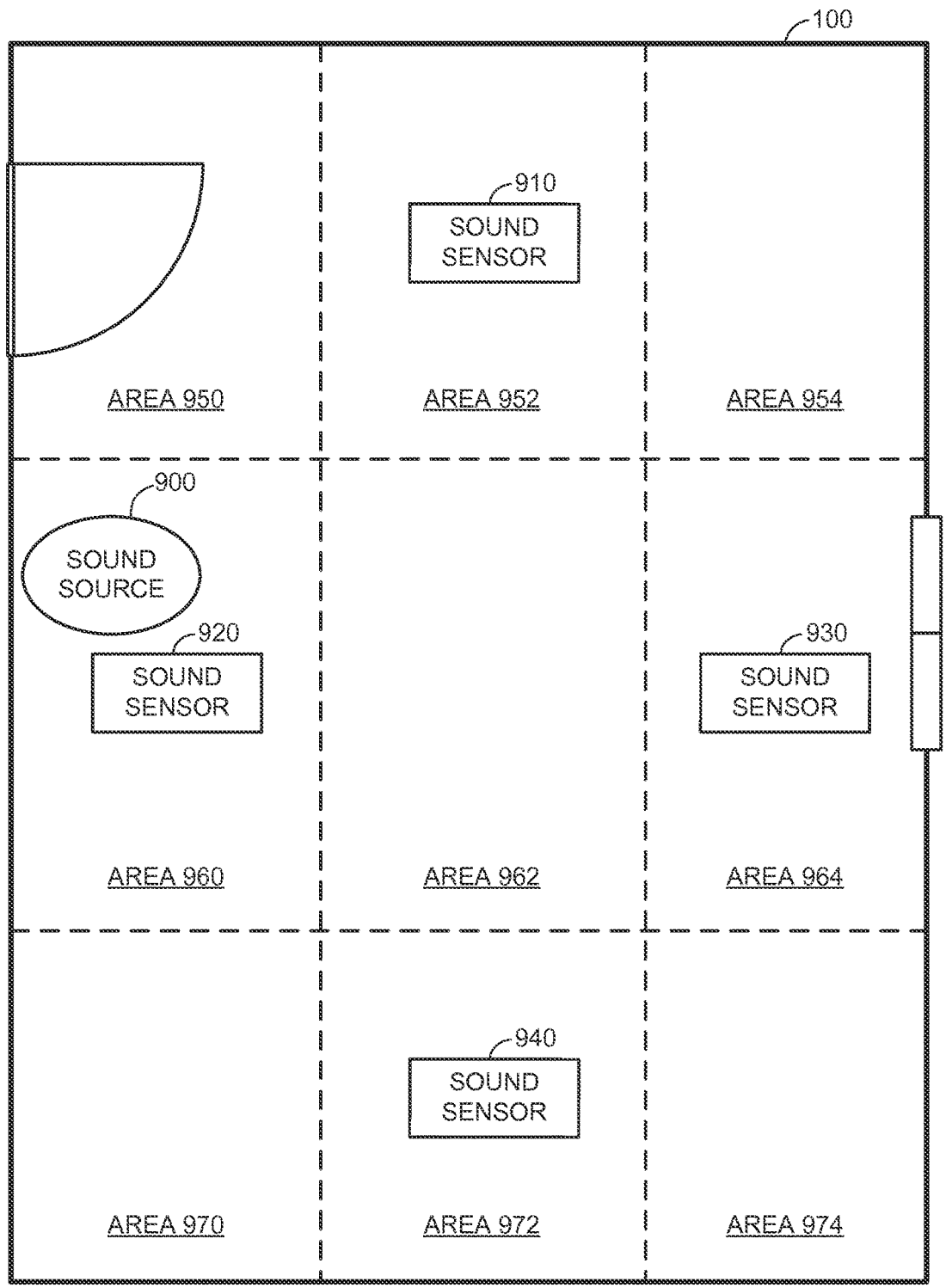
FIG. 9 illustrates an exemplary diagram for determining a location of an input sound from a sound source by using a plurality of sound sensors, according to one embodiment of the present disclosure.

FIG. 9 illustrates an exemplary diagram for determining a location of an input sound from a sound source 900 by using a plurality of sound sensors 910, 920, 930, and 940, according to one embodiment of the present disclosure. In the illustrated embodiment, the room 100 may be divided into nine areas including areas 950, 952, 954, 960, 962, 964, 970, 972, and 974 and the sound sensors 910, 920, 930, and 940 may be disposed in the areas 952, 960, 964, and 972, respectively. The sound source 900 may be located in the area 960 near the sound sensor 920.

As the input sound from the sound source 900 is being received, each of the sound sensors 910 to 940 may generate and provide sound data corresponding to the input sound to the electronic device 110. Upon receiving the sound data from the sound sensors 910 to 940, the electronic device 110 may detect an intensity of the sound data received from each of the sound sensors 910 to 940. The electronic device 110 may then determine a location of the sound source 900 relative to the sound sensors 910 to 940 by calculating a difference in the sound intensity between the sound data from each pair of the sound sensors 910 to 940. Additionally, the electronic device 110 may also use a distance between each pair of the sound sensors 910 to 940 or locations of the sound sensors 910 to 940 in the room 100 in determining the location of the sound source 900. Based on such differences in the sound intensities and distances between the sound sensors 910 to 940 or the locations of the sound sensors 910 to 940, the electronic device 110 may determine the location of the input sound from the sound source 900 as being nearest to the sound sensor 920 in the area 960.

Additionally or alternatively, the electronic device 110 may select one of the sound sensors 910 to 940 that is associated with sound data having a highest sound intensity. In the illustrated embodiment, the electronic device 110 may determine that the sound intensity received from the sound sensor 920 has a highest sound intensity. In this case, the sound source 900 may be determined to be located in area 960 based on the location of the sound sensor 920. Although the sound sensors 910 and 940 are shown, any suitable number of sound sensors may be used in determining the location of the sound source 900.

FIG. 10 illustrates an exemplary audio event log 1000 generated by the electronic device 110 over a period of time, according to one embodiment of the present disclosure. The audio event log 1000 may include a list of audio events identified by the electronic device 110. In the illustrated embodiment, the audio event log 1000 may store a plurality of audio events identified by the electronic device 110 along with location and time information associated with each of the audio events. In one embodiment, input sounds associated with the identified audio events may also be stored in the audio event log 1000. Additionally or alternatively, one or more images associated with each of the audio events may also be stored in the audio event log 1000. In some embodiments, the audio event log 1000 may be used as a historical data of audio events.

Figure 11:
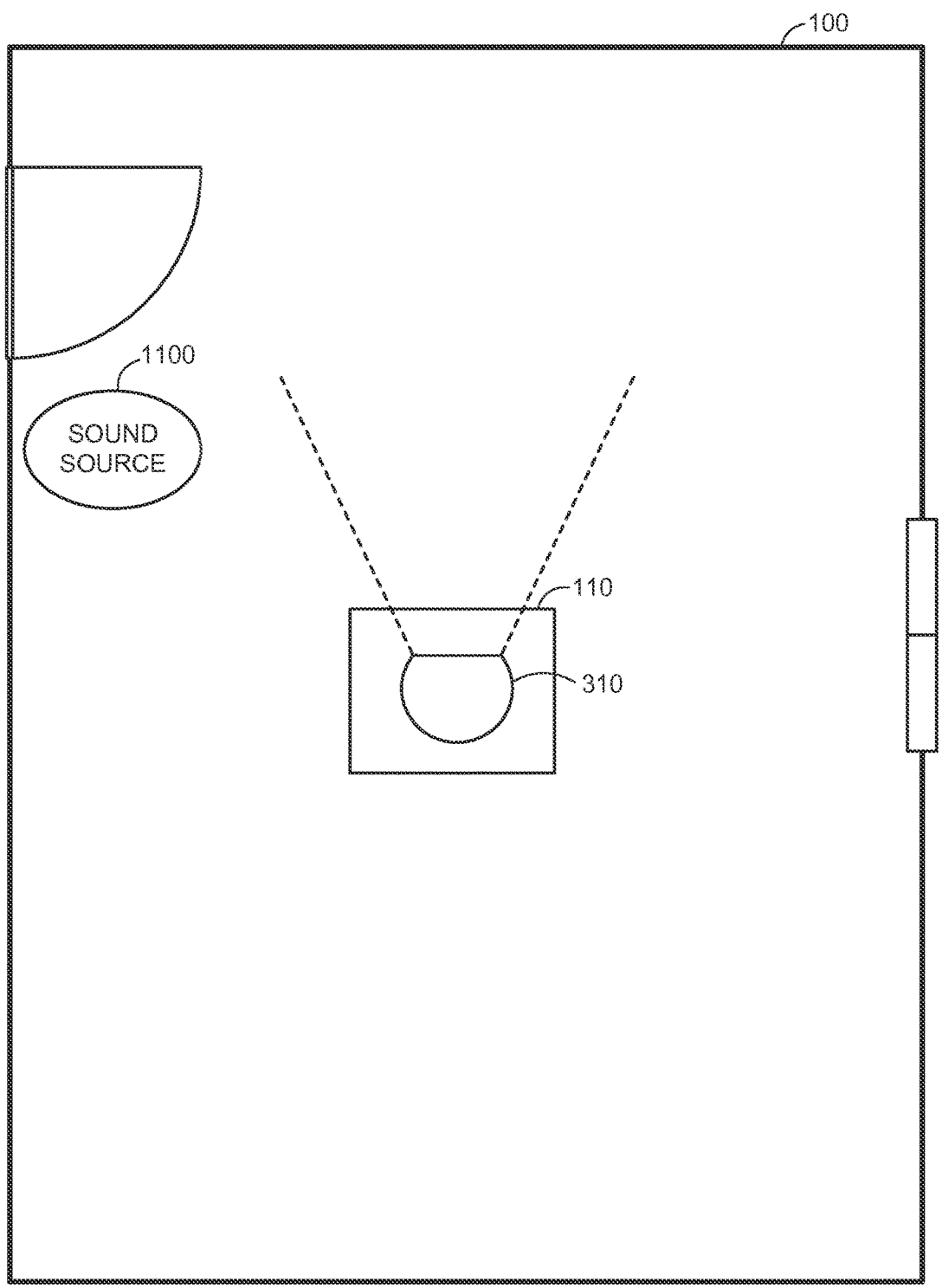
FIG. 11 illustrates an electronic device configured to activate an image sensor in response to determining an audio event for an input sound received from a sound source, according to one embodiment of the present disclosure.

FIG. 11 illustrates the electronic device 110 configured to activate the image sensor 310 in response to determining an audio event for an input sound received from a sound source 1100, according to one embodiment of the present disclosure. In the illustrated embodiment, the electronic device 110 may identify the audio event for the input sound from the sound source 1100 based on location information of the sound source 1100. The electronic device may then determine whether the identified audio event is a predetermined audio event associated with a location indicated by the location information of the sound source 1100. For example, the electronic device may determine whether the identified audio event is one of a plurality of audio events associated with the location indicated by the location information of the sound source 1100. If the identified audio event is a predetermined audio event, the electronic device may activate the image sensor 310 to capture one or more images.

Figure 12:
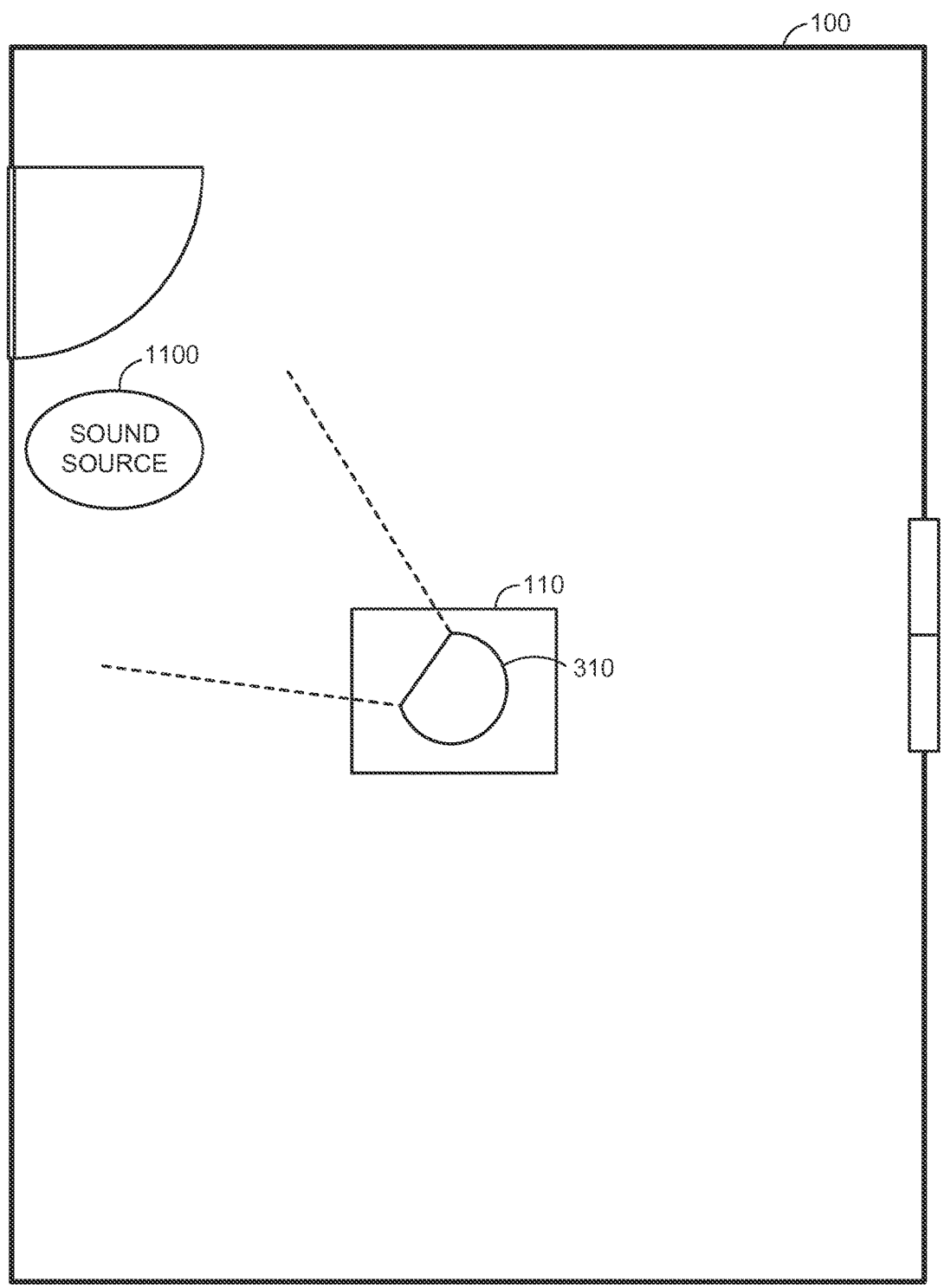
FIG. 12 illustrates an electronic device configured to adjust an image sensor towards a sound source of an input sound, according to one embodiment of the present disclosure.

FIG. 12 illustrates the electronic device 110 configured to adjust the image sensor 310 towards the sound source 1100 of the input sound, according to one embodiment of the present disclosure. In the illustrated embodiment, upon determining that the identified audio event is a predetermined audio event associated with a location indicated by the location information of the sound source 1100, the electronic device 110 may adjust the image sensor 310 in a direction towards the sound source 1100 based on the location information of the sound source 1100. For example, the electronic device may move or rotate the image sensor 310 towards a location or direction of the sound source 1100 based on the location information after activating the image sensor.

Figure 13:
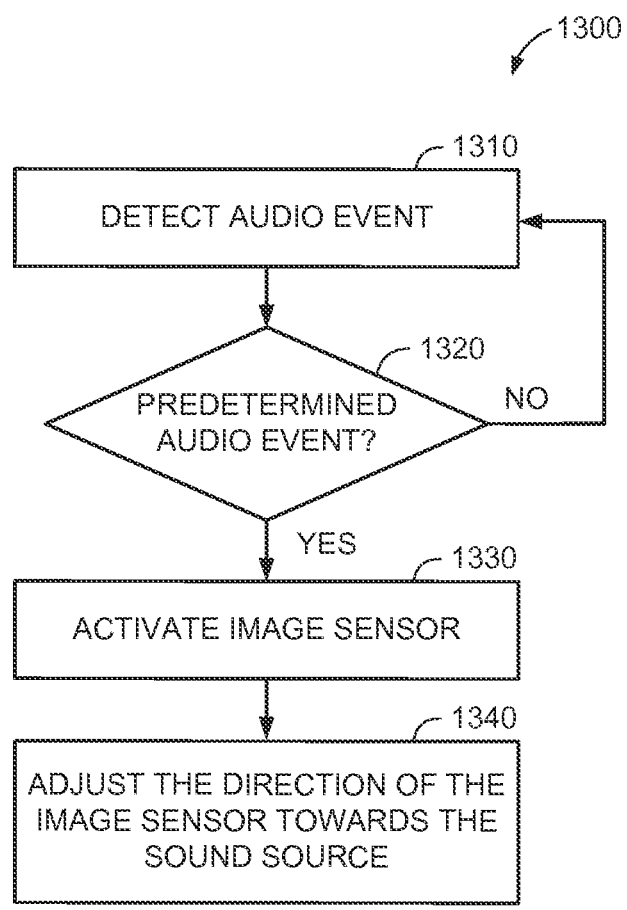
FIG. 13 illustrates a flowchart of an exemplary method performed in an electronic device for activating and adjusting a direction of an image sensor in response to detecting an audio event, according to one embodiment of the present disclosure.

FIG. 13 illustrates a flowchart of an exemplary method 1300 performed in the electronic device 110 for activating and adjusting a direction of the image sensor 310 in response to detecting an audio event, according to one embodiment of the present disclosure. Initially, the electronic device 110 may detect an audio event for an input sound from a sound source based on location information of the sound source at 1310. At 1320, the electronic device 110 may determine whether the detected audio event is a predetermined audio event associated with a location indicated by the location information of the sound source. For example, the electronic device may determine whether the identified audio event is one of a plurality of audio events associated with the location indicated by the location information of the sound source 1100.

If the detected audio event is a predetermined audio event (i.e., YES at 1320), the method 1300 may proceed to 1330 to activate the image sensor 310. On the other hand, if the detected audio is not a predetermined audio event (i.e., NO at 1320), the method 1320 may proceed back to 1310 to detect audio events. After activating the image sensor, the electronic device 110 may adjust a direction of the image sensor 310 towards the sound source based on the location information of the sound source at 1340. For example, the electronic device 110 may move or rotate the image sensor 310 towards a location or direction of the sound source based on the location information. Although the method is performed such that the image sensor is adjusted after activation, the method may also be performed such that the image sensor is activated after adjusting the image sensor based on the location information of the sound source.

Figure 14:
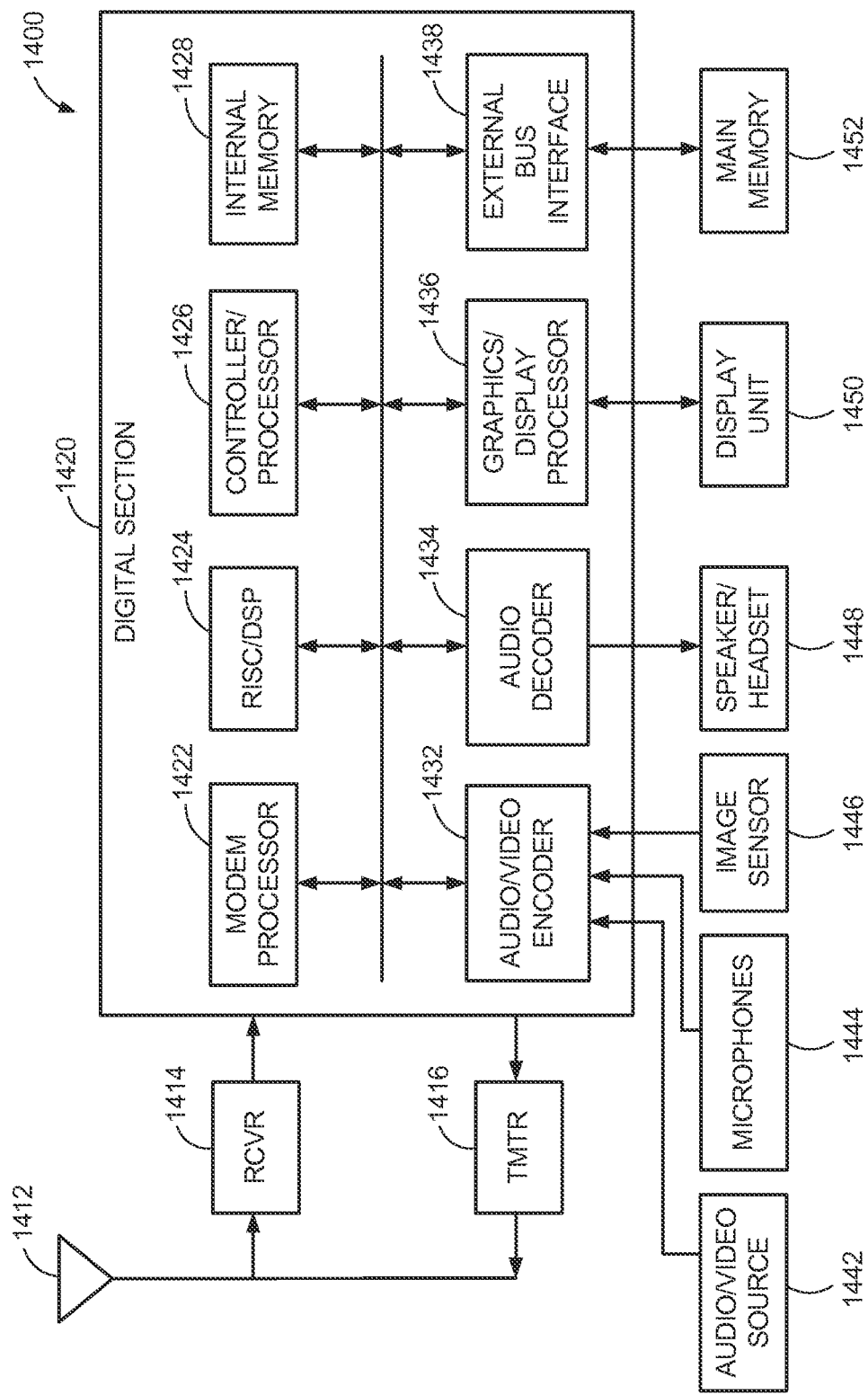
FIG. 14 illustrates a block diagram of an electronic device in which the methods and apparatus of the present disclosure for determining an audio event for an input sound may be implemented according to some embodiments.

FIG. 14 illustrates a block diagram of an electronic device 1400 in which the methods and apparatus of the present disclosure for determining an audio event for an input sound may be implemented according to some embodiments. The electronic device 1400 may be an audio/video surveillance system, a webcam, a smartphone, a laptop computer, a tablet computer, a gaming device, a multimedia player, a smart TV, a terminal, a wireless modem, a cordless phone, a tablet, and so on. The wireless communication system may be a CDMA system, a GSM system, a W-CDMA system, a LTE system, a LTE Advanced system, a Wi-Fi system and so on.

The electronic device 1400 may be capable of providing bidirectional communication via a receive path and a transmit path. On the receive path, signals transmitted by base stations may be received by an antenna 1412 and may be provided to a receiver (RCVR) 1414. The receiver 1414 may condition and digitize the received signal, and provide the conditioned and digitized digital signal to a digital section for further processing. On the transmit path, a transmitter (TMTR) 1416 may receive data to be transmitted from a digital section 1420, process and condition the data, and generate a modulated signal, which is transmitted via the antenna 1412 to the base stations. The receiver 1414 and the transmitter 1416 may be part of a transceiver that may support CDMA, GSM, W-CDMA, LTE, LTE Advanced, Wi-Fi and so on.

The digital section 1420 may include various processing, interface, and memory units such as, for example, a modem processor 1422, a reduced instruction set computer/digital signal processor (RISC/DSP) 1424, a controller/processor 1426, an internal memory 1428, a generalized audio/video encoder 1432, a generalized audio decoder 1434, a graphics/display processor 1436, and an external bus interface (EBI) 1438. The modem processor 1422 may perform processing for data transmission and reception, e.g., encoding, modulation, demodulation, and decoding. The RISC/DSP 1424 may perform general and specialized processing for the electronic device 1400. The controller/processor 1426 may perform the operation of various processing and interface units within the digital section 1420. The internal memory 1428 may store data and/or instructions for various units within the digital section 1420.

The generalized audio/video encoder 1432 may perform encoding for input signals from an audio/video source 1442, a microphone 1444, an image sensor 1446, etc. The generalized audio decoder 1434 may perform decoding for coded audio data and may provide output signals to a speaker/headset 1448. The graphics/display processor 1436 may perform processing for graphics, videos, images, and texts, which may be presented to a display unit 1450. The EBI 1438 may facilitate transfer of data between the digital section 1420 and a main memory 1452.

The digital section 1420 may be implemented with one or more processors, DSPs, microprocessors, RISCs, etc. The digital section 1420 may also be fabricated on one or more application specific integrated circuits (ASICs) and/or some other type of integrated circuits (ICs).

Aspects of the Present Disclosure

Hereinafter, some aspects of the present disclosure will be additionally stated.

Example 1

According to an aspect of the present disclosure, there is provided a method of determining, by an electronic device, an audio event including receiving, by a plurality of sound sensors, an input sound from a sound source; extracting, by a processor, at least one sound feature from the received input sound; determining, by the processor, location information of the sound source based on the input sound received by the sound sensors; determining, by the processor, the audio event indicative of the input sound based on the at least one sound feature and the location information;

and transmitting, by a communication unit, a notification of the audio event to an external electronic device.

Example 2

In the method of Example 1, determining the audio event is further based on prior occurrences of the audio event at a location indicated by the location information.

Example 3

In the method of Example 1 or 2, determining the audio event includes modifying a detection model associated with the audio event based on the location information; and determining the audio event based on the modified detection model.

Example 4

The method of any one of Examples 1 to 3 further includes storing, in a storage unit, the audio event, the location information of the sound source, and a timestamp indicative of a time the input sound is received by the sound sensors.

Example 5

In the method of any one of Examples 1 to 4 transmitting the notification of the audio event includes transmitting the notification of the audio event upon determining that the audio event is a predetermined audio event associated with a location indicated by the location information.

Example 6

In the method of any one of Examples 1 to 5 further includes capturing, by an image sensor, at least one image.

Example 7

In the method of any one of Examples 1 to 6 further includes adjusting a direction of the image sensor towards the sound source based on the location information.

Example 8

The method of any one of Examples 1 to 7, the location information includes at least one of a direction of the sound source or a location of the sound source relative to the sound sensors.

Example 9

The method of any one of Examples 1 to 8, at least one of the sound sensors are located in a room, and determining the audio event is further based on location information of at least one object in the room.

Example 10

The method of any one of Examples 1 to 9, the sound sensors are located in a plurality of rooms, determining the audio event is further based on identification information of the rooms, and the identification information for each of the rooms includes location information and a type of the room.

Example 11

According to another aspect of the present disclosure, there is provided an electronic device including a plurality of sound sensors configured to receive an input sound from a sound source; a feature extractor configured to extract at least one sound feature from the input sound; a location determination unit configured to determine location information of the sound source based on the input sound received by the plurality of sound sensors; and an audio event determination unit configured to determine an audio event indicative of the input sound based on the at least one sound feature and the location information.

Example 12

In the electronic device of Example 11, the audio event determination unit is configured to determine the audio event further based on prior occurrences of the audio event at a location indicated by the location information.

Example 13

In the electronic device of Example 11 or 12, the audio event determination unit is configured modify a detection model associated with the audio event based on the location information; and determine the audio event based on the modified detection model.

Example 14

The electronic device of any one of Examples 11 to 13 further includes a notification generating unit configured to generate a notification of the audio event upon determining that the audio event is a predetermined audio event associated with a location indicated by the location information.

Example 15

In the electronic device of any one of Examples 11 to 14, at least one of the sound sensors are located in a room, and the audio event determination unit is configured to determine the audio event further based on location information of at least one object in the room.

Example 16

In the electronic device of any one of Examples 11 to 15, the sound sensors are located in at least one room, and the audio event determination unit is configured to determine the audio event further based on location information of the at least one room.

Example 17

According to still another aspect of the present disclosure, there is provided an electronic device including means for receiving an input sound from a sound source; means for extracting at least one sound feature from the input sound; means for determining location information of the sound source based on the input sound received by the means for receiving an input sound; and means for determining an audio event indicative of the input sound based on the at least one sound feature and the location information.

Example 18

The electronic device of Example 17, the means for determining an audio event is configured to determine the audio event further based on prior occurrences of the audio event at a location indicated by the location information.

Example 19

In the electronic device of Example 17 or 18, the means for determining an audio event is configured modify a detection model associated with the audio event based on the location information; and determine the audio event based on the modified detection model.

Example 20

In the electronic device of any one of Examples 17 to 19 further includes means for generating a notification of the audio event upon determining that the audio event is a predetermined audio event associated with a location indicated by the location information.

Example 21

The electronic device of any one of Examples 17 to 20, at least one of the means for receiving an input sound are located in a room, and the means for determining an audio event is configured to determine the audio event further based on location information of at least one object in the room.

Example 22

In the electronic device of any one of Examples 17 to 21, the means for receiving an input sound are located in at least one room, and the means for determining an audio event is configured to determine the audio event further based on location information of the at least one room.

Example 23

According to yet another aspect of the present disclosure, there is provided a non-transitory computer-readable storage medium comprising instructions causing at least one processor of an electronic device to perform operations of receiving, by a plurality of sound sensors, an input sound from a sound source; extracting at least one sound feature from the received input sound; determining location information of the sound source based on the input sound received by the plurality of sound sensors; determining an audio event indicative of the input sound based on the at least one sound feature and the location information and transmitting a notification of the audio event to an external electronic device.

Example 24

The non-transitory computer-readable storage medium of Example 23, determining the audio event is further based on prior occurrences of the audio event at a location indicated by the location information.

Example 25

In the non-transitory computer-readable storage medium of Example 23 or 24, determining the audio event includes modifying a detection model associated with the audio event based on the location information; and determining the audio event based on the modified detection model.

Example 26

In the non-transitory computer-readable storage medium of any one of Examples 23 to 25 further includes instructions causing the at least one processor of the electronic device to perform operations of storing the audio event, the location information of the sound source, and a timestamp indicative of a time the input sound is received by the sound sensors.

Example 27

The non-transitory computer-readable storage medium of any one of Examples 23 to 26, transmitting the notification of the audio event includes transmitting the notification of the audio event upon determining that the audio event is a predetermined audio event associated with a location indicated by the location information.

Example 28

The non-transitory computer-readable storage medium of any one of Examples 23 to 27 further includes instructions causing the at least one processor of the electronic device to perform operations of capturing, by an image sensor, at least one image.

Example 29

In the non-transitory computer-readable storage medium of Examples 23 to 28 further includes instructions causing the at least one processor of the electronic device to perform operations of adjusting a direction of the image sensor towards the sound source based on the location information.

Example 30

In the non-transitory computer-readable storage medium of Examples 23 to 29, at least one of the sound sensors are located in a room, and determining the audio event is further based on location information of at least one object in the room.

What is claimed:

1. A method of determining, by an electronic device, one or more audio events, the method comprising:
   receiving, by a plurality of sound sensors, an input sound from a sound source;
   extracting, by a processor, at least one sound feature from the input sound;
   determining, by the processor, location information of the sound source based on the input sound received by the plurality of sound sensors;
   identifying, by the processor, at least one object associated with the location information of the sound source based on environmental information, wherein the environmental information includes location data of the at least one object, wherein the location data of the at least one object indicates a position of the at least one object relative to one or more sound sensors of the plurality of sound sensors, and wherein the at least one object is distinct from the plurality of sound sensors;
   determining, by the processor, an audio event indicative of the input sound based on the location information of the sound source, the at least one object associated with the location information of the sound source, and the at least one sound feature; and
   transmitting, by a communication unit, a notification of the audio event to an external electronic device.

2. The method of claim 1, wherein the location information of the sound source indicates a position of the sound source relative to the one or more sound sensors of the plurality of sound sensors, wherein the environmental information further includes room type identification information, historical data of previously determined audio events near the position indicated by the location information, or a combination thereof, and wherein the position of the at least one object indicated by the location data is located near the position of the sound source indicated by the location information of the sound source.

3. The method of claim 1, wherein determining the audio event comprises:
modifying a detection model associated with the audio event based on the at least one object associated with the location information of the sound source; and
determining the audio event based on the modified detection model.

4. The method of claim 1, wherein at least one location near the plurality of sound sensors is associated with one or more types of audio events, and wherein transmitting the notification of the audio event comprises transmitting the notification of the audio event responsive to determining that the audio event corresponds to a particular type of audio event of the one or more types of audio events associated with a position indicated by the location information.

5. The method of claim 1, further comprising:
adjusting a direction of an image sensor towards the sound source based on the location information; and
capturing, by the image sensor, at least one image, wherein the at least one object is identified further based on the at least one image.

6. The method of claim 1, wherein the location information of the sound source includes at least one of a direction of the sound source or a position of the sound source relative to the one or more sound sensors of the plurality of sound sensors.

7. The method of claim 1, wherein at least one sound sensor of the plurality of sound sensors is located in a room, wherein the at least one object is located in the room, and wherein the position of the at least one object indicated by the location data further indicates a particular position in the room where the at least one object is located.

8. The method of claim 1, wherein the plurality of sound sensors are located in a plurality of rooms, wherein the environmental information further includes room identification information of each room of the plurality of rooms, and wherein the room identification information for each of the rooms includes room location information and a type of the room.

9. An electronic device comprising:
a plurality of sound sensors configured to receive an input sound from a sound source;
a feature extractor configured to extract at least one sound feature from the input sound;
a location determination unit configured to determine location information of the sound source based on the input sound received by the plurality of sound sensors; and
an audio event determination unit configured to:
identify at least one object associated with the location information of the sound source based on environmental information, wherein the environmental information includes location data of the at least one object, wherein the location data of the at least one object indicates a position of the at least one object relative to one or more sound sensors of the plurality of sound sensors, and wherein the at least one object is distinct from the plurality of sound sensors; and
determine an audio event indicative of the input sound based on the location information of the sound source, the at least one object associated with the location information of the sound source, and the at least one sound feature.

10. The electronic device of claim 9, wherein the audio event determination unit is configured to:
modify a detection model associated with the audio event based on the location information and the environmental information; and
determine the audio event based further on the modified detection model.

11. The electronic device of claim 9, further comprising a notification generating unit configured to generate a notification of the audio event responsive to determining that the audio event is an audio event type or audio event class associated with a position indicated by the location information.

12. The electronic device of claim 9, wherein the plurality of sound sensors are located in at least one room, and wherein the location data of the at least one object is associated with the at least one room.

13. An electronic device comprising:
means for receiving an input sound from a sound source;
means for extracting at least one sound feature from the input sound;
means for determining location information of the sound source based on the input sound received by the means for receiving an input sound;
means for identifying at least one object associated with the location information of the sound source based on environmental information, wherein the environmental information includes location data of the at least one object, wherein the location data of the at least one object indicates a position of the at least one object relative to the means for receiving, and wherein the at least one object is distinct from the means for receiving; and
means for determining an audio event indicative of the input sound based on the location information of the sound source, the at least one object associated with the location information of the sound source, and the at least one sound feature.

14. The electronic device of claim 13, wherein the environmental information further includes historical data indicating prior occurrences of the audio event at a position indicated by the location information.

15. The electronic device of claim 13, wherein the means for determining the audio event is configured to:
determine a detection probability of the audio event based on the at least one sound feature;
modify the detection probability based on the location information and the environmental information; and
determine the audio event based on the modified detection probability.

16. The electronic device of claim 13, further comprising means for generating a notification of the audio event responsive to determining that a score associated with the audio event is greater than or equal to a threshold.

17. A non-transitory computer-readable storage medium comprising instructions causing at least one processor of an electronic device to perform operations comprising:
receiving, via a plurality of sound sensors, an input sound from a sound source;

extracting at least one sound feature from the input sound;
determining location information of the sound source based on the input sound received by the plurality of sound sensors;
identifying at least one object associated with the location information of the sound source based on environmental information, wherein the environmental information includes location data of the at least one object, wherein the location data of the at least one object indicates a position of the at least one object relative to one or more sound sensors of the plurality of sound sensors, and wherein the at least one object is distinct from the plurality of sound sensors;
determining an audio event indicative of the input sound based on the location information of the sound source, the at least one object associated with the location information of the sound source, and the at least one sound feature; and
transmitting a notification of the audio event to an external electronic device.

18. The non-transitory computer-readable storage medium of claim 17, wherein the operations further comprise comparing a number of occurrences of particular previously determined audio events near a position indicated by the location information and having the same type of sound as the audio event to a threshold, and wherein the notification is transmitted based on the number being less than the threshold.

19. The non-transitory computer-readable storage medium of claim 17, wherein the operations further comprise storing, at a memory of the electronic device, the audio event, the location information of the sound source, and a timestamp indicative of a time the input sound is received by the plurality of sound sensors.

20. The non-transitory computer-readable storage medium of claim 17, wherein the operations further comprise:
updating an audio event log responsive to determining the audio event and prior to determining whether the audio event is indicative of the input sound;
capturing, via an image sensor, one or more images of a portion of a room near a position indicated by the location information, wherein the plurality of sounds sensors are located in the room; and
determining the environmental information based on the one or more images.

21. The method of claim 1, wherein the audio event comprises a speech sound, a screaming sound, a crying sound, a door knocking sound, a glass breaking sound, a gunshot sound, a footstep sound, a falling sound, or a television sound.

22. The method of claim 1, further comprising determining, by the processor, a second audio event indicative of a second input sound based on a second sound feature, second location information of a second sound source of the second input sound, and the environmental information, wherein the second input sound corresponds to a gunshot sound produced by a television, and wherein determining the second audio event includes:
determining that a position of the second sound source corresponds to a position associated with the television based on the second location information and the environmental information;
determining that the second audio event corresponds to a sound produced by the television; and
refraining from transmitting a notification based on determining that the second audio event corresponds to the sound produced by the television.

23. The method of claim 1, wherein determining the audio event is performed by a device that comprises a mobile device.

24. The electronic device of claim 9, further comprising:
an antenna; and
a transmitter coupled to the antenna and configured to transmit a notification of the audio event to an external electronic device via the antenna.

25. The electronic device of claim 24, wherein the plurality of sound sensors, the feature extractor, the location determination unit, the audio event determination unit, the transmitter, and the antenna are integrated into a mobile device.

26. The electronic device of claim 13, wherein the means for receiving, the means for extracting, the means for determining the location information, the means for determining the audio event, and the means for determining whether the audio event is indicative of the input sound are integrated into a mobile device.

27. The method of claim 1, wherein the at least one sound feature corresponds to one or more Mel-frequency cepstral coefficients (MFCC), and wherein the audio event corresponds to a type of sound or a class of sound.

28. The method of claim 1, wherein determining the audio event comprises:
selecting a particular sound type from a plurality of sound types based on a classification model, the particular sound type corresponding to a sound type of the input sound; and
determining, based on the location data, that the particular sound type is associated with a position indicated by the location information of the sound source.

29. The electronic device of claim 9, wherein the audio event determination unit is configured to:
identify that the audio event is associated with the at least one sound feature based on a classification model; and
verify that the identified audio event is indicative of the input sound based on the at least one object associated with the location information of the sound source.

30. The method of claim 1, wherein determining the audio event comprises:
modifying a classification model based on the at least one object associated with the location information of the sound source; and
calculating detection probabilities of the one or more sound features for the audio events based on the modified classification model.

* * * * *